(12) United States Patent
Shin et al.

(10) Patent No.: US 10,466,541 B2
(45) Date of Patent: Nov. 5, 2019

(54) DISPLAY DEVICE AND METHOD OF MANUFACTURING THE SAME

(71) Applicant: Samsung Display Co., Ltd., Yongin-si (KR)

(72) Inventors: Ki Chul Shin, Seongnam-si (KR); Ho Kil Oh, Seoul (KR)

(73) Assignee: Samsung Display Co., Ltd, Yongin-si (KR)

( * ) Notice: Subject to any disclaimer, the term of this patent is extended or adjusted under 35 U.S.C. 154(b) by 145 days.

(21) Appl. No.: 15/680,419

(22) Filed: Aug. 18, 2017

(65) Prior Publication Data

US 2018/0224701 A1 Aug. 9, 2018

(30) Foreign Application Priority Data

Feb. 8, 2017 (KR) ........................ 10-2017-0017342

(51) Int. Cl.
*G02F 1/1335* (2006.01)
*G02F 1/1337* (2006.01)
(Continued)

(52) U.S. Cl.
CPC .. *G02F 1/133617* (2013.01); *G02F 1/133512* (2013.01); *G02F 1/133514* (2013.01);
(Continued)

(58) Field of Classification Search
CPC ........... G02F 1/13362; G02F 1/133528; G02F 1/133512
See application file for complete search history.

(56) References Cited

U.S. PATENT DOCUMENTS

2001/0003473 A1* 6/2001 Galabova ............... B82Y 15/00
349/98
2003/0127656 A1* 7/2003 Aizawa ............... H01L 51/5262
257/79
(Continued)

FOREIGN PATENT DOCUMENTS

KR 10-2015-0006448 1/2015
KR 10-2016-0084557 7/2016
KR 10-2016-0096237 8/2016

*Primary Examiner* — Lucy P Chien
(74) *Attorney, Agent, or Firm* — H.C. Park & Associates, PLC

(57) ABSTRACT

A display device including a first substrate, a pixel unit disposed on the first substrate and including a first sub-pixel electrode, a second sub-pixel electrode and a third sub-pixel electrode, the first through third sub-pixel electrodes being adjacent to one another, a second substrate facing the first substrate, a first wavelength conversion layer disposed on a surface of the second substrate facing the first substrate, and overlapping the first sub-pixel electrode, a second wavelength conversion layer disposed on the surface of the second substrate facing the first substrate, and overlapping the second sub-pixel electrode, a transmissive layer disposed on the surface of the second substrate facing the first substrate, and overlapping the third sub-pixel electrode, a first cholesteric liquid crystal layer disposed on a surface of the first wavelength conversion layer facing the first substrate, a second cholesteric liquid crystal layer disposed on a surface of the second wavelength conversion layer facing the first substrate, and a planarization layer disposed on the surfaces of the first and second cholesteric liquid crystal layers facing the first substrate and on a surface of the transmissive layer facing the first substrate. Methods of manufacturing a display device capable of reducing the number of process steps in the manufacturing process are also disclosed.

17 Claims, 12 Drawing Sheets

(51) Int. Cl.
*G02F 1/1362* (2006.01)
*G02F 1/1368* (2006.01)
*G02F 1/1333* (2006.01)

(52) U.S. Cl.
CPC .. *G02F 1/133528* (2013.01); *G02F 1/133553* (2013.01); *G02F 1/133555* (2013.01); *G02F 1/133621* (2013.01); *G02F 1/133723* (2013.01); *G02F 1/1368* (2013.01); *G02F 1/13624* (2013.01); *G02F 2001/133357* (2013.01); *G02F 2001/133548* (2013.01); *G02F 2001/133614* (2013.01); *G02F 2201/123* (2013.01); *G02F 2202/36* (2013.01); *G02F 2203/055* (2013.01)

(56) References Cited

U.S. PATENT DOCUMENTS

| | | | |
|---|---|---|---|
| 2004/0119934 A1* | 6/2004 | Park | G02F 1/133516 349/187 |
| 2006/0176258 A1* | 8/2006 | Sha | G02F 1/13718 345/88 |
| 2007/0287351 A1* | 12/2007 | Glazer | G02B 5/201 445/24 |
| 2012/0194764 A1* | 8/2012 | Ishizumi | G02B 5/201 349/69 |
| 2012/0320298 A1* | 12/2012 | Suzuki | G02F 1/133553 349/43 |
| 2014/0267449 A1* | 9/2014 | Hong | G09G 3/3659 345/690 |
| 2015/0070628 A1 | 3/2015 | Suzuki et al. | |
| 2016/0195773 A1 | 7/2016 | Lee et al. | |
| 2016/0223730 A1 | 8/2016 | Kim et al. | |

\* cited by examiner

DISPLAY DEVICE AND METHOD OF MANUFACTURING THE SAME

CROSS-REFERENCE TO RELATED APPLICATION

This application claims priority from and the benefit of Korean Patent Application No. 10-2017-0017342, filed on Feb. 8, 2017, which is hereby incorporated by reference for all purposes as if fully set forth herein.

BACKGROUND

Field

The invention relates generally to a display device and a method of manufacturing the same, and, more particularly, to a display device having a reflective layer, and a method of manufacturing the same.

Discussion of the Background

The importance of display devices has steadily grown with recent developments in multimedia technology. As a result, a variety of display devices such as a liquid crystal display (LCD) device, an organic light-emitting diode (OLED) display device, and the like have been developed and are now widespread.

The LCD device, which is one of the most widely-used flat panel displays, includes two substrates on which field-generating electrodes such as pixel electrodes and a common electrode are formed and a liquid crystal layer which is interposed between the two substrates. The LCD device generates an electric field in the liquid crystal layer by applying voltages to the field-generating electrodes so as to determine the orientation of liquid crystal molecules in the liquid crystal layer, and displays an image by controlling the polarization of light incident thereupon using the electric field.

A vertical alignment (VA)-mode LCD device, which is a type of LCD device in which liquid crystal molecules are aligned such that their long axes are perpendicular to upper and lower display panels in the absence of an electric field, has been highlighted because of its high contrast ratio and wide reference viewing angle.

Also, an LCD device has been proposed that displays colors using a fluorescent substance or a phosphor that emits light of a particular wavelength band upon receiving light. This type of LCD device needs a reflective layer for reflecting light of the particular wavelength band emitted from the fluorescent substance or the phosphor toward the front of the LCD device, i.e., in a direction toward the observer, but the manufacturing process is complex typically requiring multiple steps and cost to manufacture the reflective layer is generally high.

The above information disclosed in this Background section is only for enhancement of understanding of the background of the inventive concepts, and, therefore, it may contain information that does not form the prior art that is already known in this country to a person of ordinary skill in the art.

SUMMARY

Display device constructed according to the principles of the invention include a reflective layer that can be manufactured at low cost and have improved reflectance.

Methods of manufacturing a display device according to the principles of the invention produce a reflective layer that can be manufactured at lower cost and has improved reflectance. For example, cholesteric liquid crystal layers can be formed in exemplary methods by an inkjet process, rather than by a Chemical Vapor Deposition (CVD) process, which is more costly. Thus, the manufacturing cost of a display device constructed according to the principles of the invention can be reduced as compared to devices in which layers that perform the functions of the cholesteric liquid crystal layers are formed by CVD or other similar methods.

Additional aspects will be set forth in the detailed description which follows, and, in part, will be apparent from the disclosure, or may be learned by practice of the inventive concepts.

According to one aspect of the invention, a display device includes a first substrate, a pixel unit disposed on the first substrate and including a first sub-pixel electrode, a second sub-pixel electrode and a third sub-pixel electrode, the first through third sub-pixel electrodes being adjacent to one another, a second substrate facing the first substrate, a first wavelength conversion layer disposed on a surface of the second substrate facing the first substrate, and overlapping the first sub-pixel electrode, a second wavelength conversion layer disposed on the surface of the second substrate facing the first substrate, and overlapping the second sub-pixel electrode, a transmissive layer disposed on the surface of the second substrate facing the first substrate, and overlapping the third sub-pixel electrode, a first cholesteric liquid crystal layer disposed on a surface of the first wavelength conversion layer facing the first substrate, a second cholesteric liquid crystal layer disposed on a surface of the second wavelength conversion layer facing the first substrate, and a planarization layer disposed on the surfaces of the first and second cholesteric liquid crystal layers facing the first substrate and on a surface of the transmissive layer facing the first substrate.

The first and second cholesteric liquid crystal layers may include at least one of a quantum dot and a phosphor.

The first wavelength conversion layer may be configured to receive light of a first wavelength band and to convert the received light into light of a second wavelength band different from the first wavelength band. The second wavelength conversion layer may be configured to receive the light of the first wavelength band and to convert the received light into light of a third wavelength band different form the second wavelength band.

The transmissive layer may be configured to transmit the light of the first wavelength band therethrough.

The first cholesteric liquid crystal layer may be configured to reflect some of the light of the second wavelength band. The second cholesteric liquid crystal layer may be configured to reflect some of the light of the third wavelength band.

The first and second cholesteric liquid crystal layers may include impurities. A concentration or type of the impurities included in the first cholesteric liquid crystal layer may differ from a concentration or type of the impurities included in the second cholesteric liquid crystal layer.

During operation of the display device, the light of the second wavelength band reflected by the first cholesteric liquid crystal layer may be right-handed polarized light, and the light of the third wavelength band reflected by the first cholesteric liquid crystal layer may be right-handed polarized light.

The display device may further include an alignment film disposed on at least one surface of each of the first and second cholesteric liquid crystal layers.

The display device may further include a opaque member disposed on the surface of the second substrate facing the first substrate and forming barriers, which separate the first cholesteric liquid crystal layer, the second cholesteric liquid crystal layer, and the transmissive layer from one another.

The opaque member may include a light-shielding member projecting toward the first substrate beyond the surfaces of the first and second cholesteric liquid crystal layers facing the first substrate.

The display device may further include a polarizing layer disposed on a surface of the planarization layer facing the first substrate.

The polarizing layer may include a wire grid polarizer.

According to another aspect of the invention, a display device includes a first substrate, a pixel unit disposed on the first substrate and including a first sub-pixel electrode, a second sub-pixel electrode and a third sub-pixel electrode, the first through third sub-pixel electrodes being adjacent to one another, a second substrate facing the first substrate, a opaque member disposed on a surface of the second substrate facing the first substrate having openings to permit light from the first through third sub-pixel electrodes to pass through a respective one of the openings, a first wavelength conversion layer disposed on a surface of the opaque member facing the first substrate, and overlapping the first sub-pixel electrode, a second wavelength conversion layer disposed on the surface of the opaque member facing the first substrate, and overlapping the second sub-pixel electrode, a transmissive layer disposed on the surface of the opaque member facing the first substrate, and overlapping the third sub-pixel electrode, a reflective layer disposed on surfaces of the first wavelength conversion layer, the second wavelength conversion layer, and the transmissive layer facing the first substrate, and a planarization layer disposed on a surface of the reflective layer facing the first substrate.

The opaque member may include a light-shielding member. The first and second cholesteric liquid crystal layers may include at least one of a quantum dot and a phosphor. The first wavelength conversion layer may be configured to receive light of a first wavelength band and to convert the received light into light of a second wavelength band different from the first wavelength band. The second wavelength conversion layer may be configured to receive the light of the first wavelength band and to convert the received light into light of a third wavelength band different from the second wavelength band.

The reflective layer may include a first cholesteric liquid crystal layer disposed on the surfaces of the first wavelength conversion layer, the second wavelength conversion layer, and the transmissive layer facing the first substrate, a blocking layer disposed on a surface of the first cholesteric liquid crystal layer facing the first substrate, and a second cholesteric liquid crystal layer disposed on a surface of the blocking layer facing the first substrate.

The first cholesteric liquid crystal layer may be configured to reflect some of the light of the second wavelength band. The second cholesteric liquid crystal layer may be configured to reflect some of the light of the third wavelength band.

The reflective layer may include a third cholesteric liquid crystal layer disposed on the surfaces of the first wavelength conversion layer, the second wavelength conversion layer, and the transmissive layer facing the first substrate.

The third cholesteric liquid crystal layer may be configured to reflect some of the light of the second wavelength band and some of the light of the third wavelength band.

According to another aspect of the invention, a method of manufacturing a display device includes the steps of preparing a substrate on which a first wavelength conversion layer configured to receive light of a first wavelength band and convert the received light into light of a second wavelength band, a second wavelength conversion layer configured to receive the light of the first wavelength band and convert the received light into light of a third wavelength band, and a transmissive layer configured to transmit the light of the first wavelength band therethrough are disposed, forming a first cholesteric liquid crystal layer on the first wavelength conversion layer, forming a second cholesteric liquid crystal layer on the second wavelength conversion layer, and forming a planarization layer on the first cholesteric liquid crystal layer, the second cholesteric liquid crystal layer, and the transmissive layer.

The steps of forming the first cholesteric liquid crystal layer and the forming the second cholesteric liquid crystal layer may be performed by an inkjet process.

According to the principles of the invention described herein, a display device including a reflective layer can be manufactured at low cost and with improved reflectance.

In addition, methods of manufacturing a display device according to the principles of the invention produce a reflective layer that can be manufactured at lower cost and having improved reflectance.

Other features and exemplary embodiments may be apparent from the following detailed description, the drawings, and the claims.

The foregoing general description and the following detailed description are exemplary and explanatory and are intended to provide further explanation of the claimed subject matter.

BRIEF DESCRIPTION OF THE DRAWINGS

The accompanying drawings, which are included to provide a further understanding of the inventive concepts, and are incorporated in and constitute a part of this specification, illustrate exemplary embodiments of the inventive concepts, and, together with the description, serve to explain principles of the inventive concepts.

DETAILED DESCRIPTION OF THE ILLUSTRATED EMBODIMENTS

Figure 1:
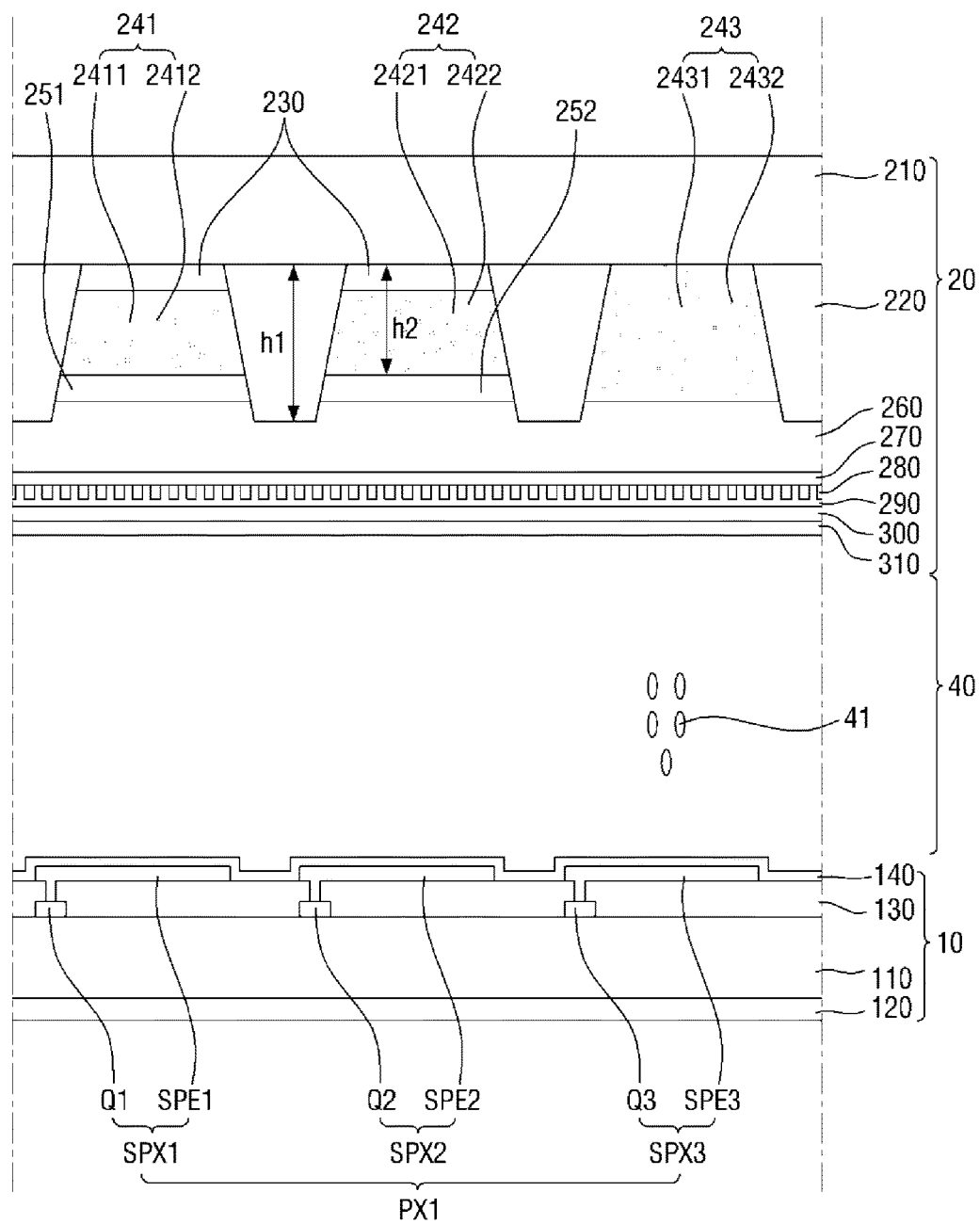
FIG. 1 is a cross-sectional view of a first embodiment of a display device constructed according to the principles of the invention.

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments.

In the accompanying figures, the size and relative sizes of layers, films, panels, regions, etc., may be exaggerated for clarity and descriptive purposes. Also, like reference numerals denote like elements.

When an element or layer is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. Like numbers refer to like elements throughout. As used herein, the term "and/or" includes any and all combinations of one or more of the associated listed items.

Although the terms first, second, etc. may be used herein to describe various elements, components, regions, layers, and/or sections, these elements, components, regions, layers, and/or sections should not be limited by these terms. These terms are used to distinguish one element, component, region, layer, and/or section from another element, component, region, layer, and/or section. Thus, a first element, component, region, layer, and/or section discussed below could be termed a second element, component, region, layer, and/or section without departing from the teachings of the disclosure.

Spatially relative terms, such as "beneath," "below," "lower," "above," "upper," and the like, may be used herein for descriptive purposes, and, thereby, to describe one element or feature's relationship to another element(s) or feature(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

Various exemplary embodiments are described herein with reference to sectional illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not be construed as limited to the particular illustrated shapes of regions, but are to include deviations in shapes that result from, for instance, manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the drawings are schematic in nature and their shapes are not intended to illustrate the actual shape of a region of a device and are not intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

Referring to FIG. 1, the display device includes a lower display panel 10, an upper display panel 20, and a liquid crystal layer 40. The terms "top", "bottom", "upper", and "lower" are defined and used with respect to the orientations of the page shown in FIG. 1. For example, the top or an upper portion of a lower substrate 110 refers to direction toward an upper substrate 210, and the bottom or a lower portion of the lower substrate 110 refers to an opposite direction to the direction toward the upper substrate 210. The top or an upper portion of an upper substrate 210 refers to a direction toward the lower substrate 110, and the bottom or a lower portion of the upper substrate 210 refers to an opposite direction to the direction toward the lower substrate 110.

The lower display panel 10 may be disposed to face the upper display panel 20. The liquid crystal layer 40 may be interposed between the lower display panel 10 and the upper display panel 20 and may include a plurality of liquid crystal molecules 41. The lower display panel 10 may be attached to the upper display panel 20 through, for example, sealing.

The lower display panel 10 will hereinafter be described.

The lower substrate 110 may be, for example, a transparent insulating substrate. Examples of the transparent insulating substrate may include a glass substrate, a quartz substrate, a transparent resin substrate, and the like.

A first polarizing layer 120 may be disposed at the bottom of the lower substrate 110. Specifically, the lower substrate 110 may have a first surface facing the upper substrate 210 and a second surface opposite to the first surface. The first polarizing layer 120 may be disposed on, for example, the second surface of the lower substrate 110. The first polarizing layer 120 may be formed of an organic material or an inorganic material. The first polarizing layer 120 may be, for example, a reflective polarizing layer. When the first polarizing layer 120 is a reflective polarizing layer, polarized components parallel to the transmission axis of the first polarizing layer 120 may be transmitted through the first polarizing layer 120, and polarized components parallel to the reflection axis of the first polarizing layer 120 may be reflected.

Alternatively, the first polarizing layer 120 may be disposed at the top of the lower substrate 110. That is, the first polarizing layer 120 may be disposed between the lower substrate 110 and a first insulating layer 130, which will be described later.

A plurality of pixel units including a first pixel unit PX1 may be disposed at the top of the lower substrate 110. The first pixel unit PX1 may include first through third sub-pixel units SPX1 through SPX3. The first through third sub-pixel units SPX1 through SPX3 may display different colors.

The first sub-pixel unit SPX1 may include a first switching element Q1 and a first sub-pixel electrode SPE1, which is electrically connected to the first switching element Q1. The second sub-pixel unit SPX2 may include a second switching element Q2 and a second sub-pixel electrode SPE2, which is electrically connected to the second switching element Q2. The third sub-pixel portion SPX3 may include a third switching element Q3 and a third sub-pixel electrode SPE3, which is electrically connected to the third switching element Q3. The first through third sub-pixel electrodes SPE1 through SPE3 may be adjacent to one another.

The first through third sub-pixel pixel units SPX1 through SPX3 will hereinafter be described in detail, taking the first sub-pixel unit SPX1 as representative.

Figure 2:
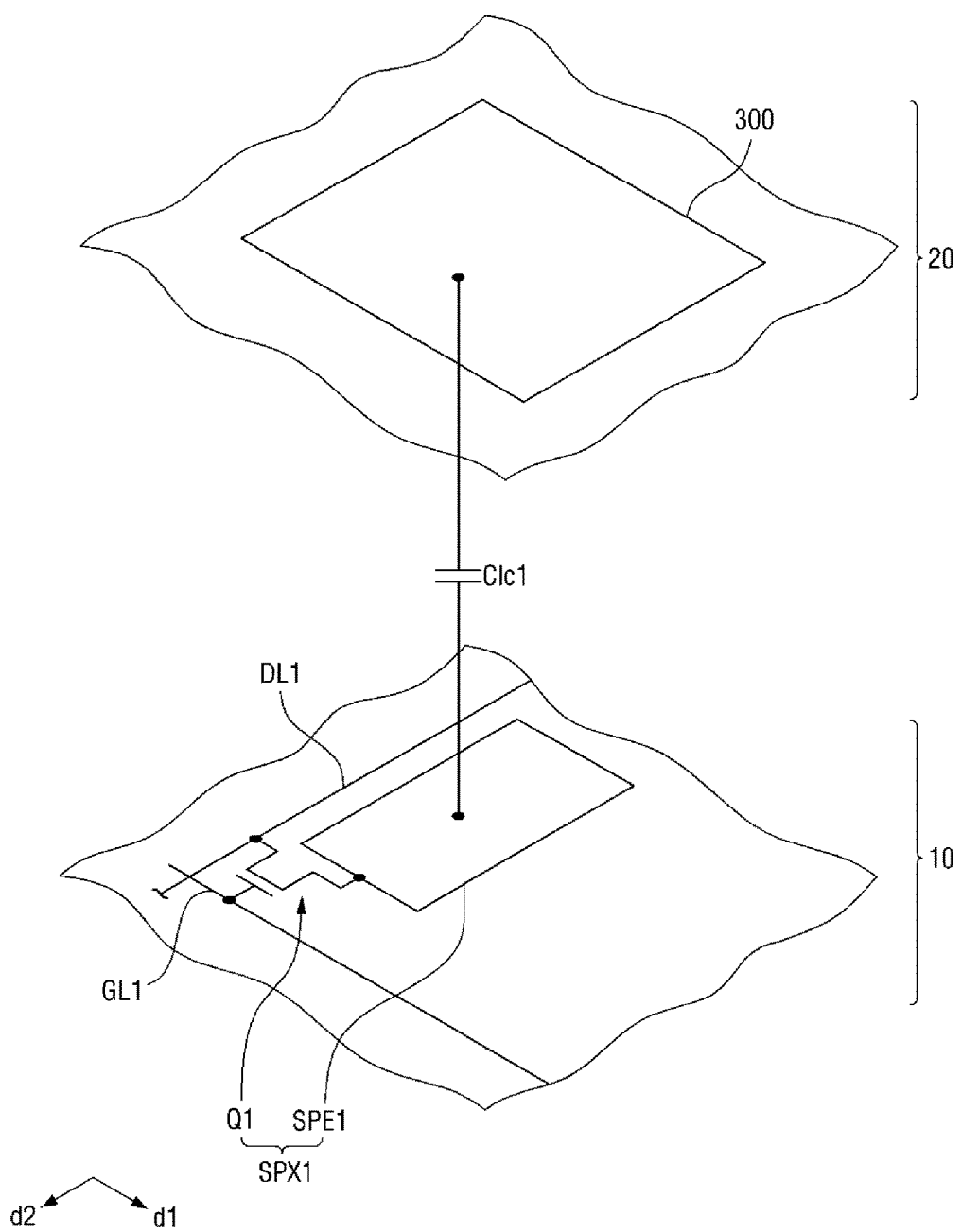
FIG. 2 is a schematic perspective view of a first sub-pixel unit of the display device of FIG. 1.

Referring to FIG. 2, the first switching element Q1 may be, for example, a three-terminal device such as a Thin-Film Transistor (TFT). A control electrode of the first switching element Q1 may be electrically connected to a first scan line GL1, and a first electrode of the first switching element Q1 may be electrically connected to a first data line DL1. A second electrode of the first switching element Q1 may be electrically connected to the first sub-pixel electrode SPE1. The first scan line GL1 may extend in, for example, a first direction d1. The first data line DL1 may extend in, for example, a second direction d2, which is different from the first direction d1. The first direction d1 may intersect the second direction d2.

The first switching element Q1 is turned on by a scan signal supplied from the first scan line GL1 and, when turned on, provides a data signal supplied from the first data line DL1 to the first sub-pixel electrode SPE1. The first sub-pixel unit SPX1 is illustrated in FIGS. 1 and 2 as including only one switching element, i.e., the first switching element Q1, but more than one switching element may be included. That is, alternatively, the first sub-pixel unit SPX1 may include two or more switching elements.

The first sub-pixel electrode SPE1 may be disposed in the lower display panel 10. Specifically, the first sub-pixel electrode SPE1 may be disposed on the first insulating layer 130, which is disposed on the lower substrate 110. A common electrode 300 may be disposed in the upper display panel 20. The first sub-pixel electrode SPE1 may at least partially overlap the common electrode 300. The first sub-pixel unit SPX1 may further include a first liquid crystal capacitor Cle1, which is formed by the first sub-pixel electrode SPE1 and the common electrode 300 overlapping with each other. The expression "two elements overlapping with each other," as used herein, means that one of the two elements is positioned over the other with or without intervening elements, such that the two elements overlap each other in a vertical direction with respect to the lower substrate 110.

Referring again to FIG. 1, the first insulating layer 130 may be disposed on the first through third switching elements Q1 through Q3. The first insulating layer 130 may be formed of an inorganic insulating material such as silicon nitride and silicon oxide. Alternatively, the first insulating layer 130 may be formed of an organic material having excellent planarization properties and having photosensitivity. The first insulating layer 130 includes a plurality of contact holes for electrically connecting the first through third switching elements Q1 through Q3, respectively, to the first through third sub-pixel electrodes SPE1 through SPE3, respectively.

The first through third sub-pixel electrodes SPE1 through SPE3 may be disposed on the first insulating layer 130. The first through third sub-pixel electrodes SPE1 through SPE3 may be formed of a transparent conductive material such as Indium Tin Oxide (ITO) and Indium Zinc Oxide (ILO) or a reflective metal such as aluminum (Al), silver (Ag), chromium, (Cr) or an alloy thereof. Each of the first through third sub-pixel electrodes SPE1 through SPE3 may overlap the common electrode 300.

The first sub-pixel electrode SPE1 may overlap a first wavelength conversion layer 241. The second sub-pixel electrode SPE2 may overlap a second wavelength conversion layer 242. The third sub-pixel electrode SPE3 may overlap a transmissive layer 243. This will be described later.

A first alignment film 140 may be disposed on the first through third sub-pixel electrodes SPE1 through SPE3. The first alignment film 140 may be formed of polyimide or the like.

The upper display panel 20 will hereinafter be described.

The upper substrate 210 may be disposed to face the lower substrate 110. The upper substrate 210 may be formed of transparent glass or plastic, and may be formed of the same material as the lower substrate 110.

A light-shielding member 220 is disposed on a surface of the upper substrate 210 facing the lower display panel 10, i.e., on the bottom surface of the upper substrate 210, to block the transmission of light to a region other than a pixel region. The light-shielding member 220 may be formed of an organic material.

Specifically, the light-shielding member 220 is disposed on the bottom surface of the upper substrate 210 to face the lower substrate 110, and may form barriers so that the first wavelength conversion layer 241, the second wavelength conversion layer 242, and the transmissive layer 243 can be separate from each other. The light-shielding member 220 may be formed to a predetermined height and may project to a first height h1 from the bottom surface of the upper substrate 210 toward the lower substrate 110. Elements described herein may be formed, through an inkjet or other known process, using the barriers formed by the light shielding member 220. The inkjet process will be described later.

A filter layer 230 may be disposed on the bottom surface of the upper substrate 210 in regions where the light-shielding member 220 is not provided. The filter layer 230 may overlap the first and second wavelength conversion layers 241 and 242.

The filter layer 230 may block the transmission of light of a first wavelength band and may allow the transmission of light of a second wavelength band and light of a third wavelength band. The filter layer 230 will hereinafter be described in connection with the first wavelength conversion layer 241.

In response to light of the first wavelength band being provided to the first wavelength conversion layer 241, some of the light of the first wavelength band may be converted into light of the second wavelength band by a first wavelength conversion material 2412, but some of the light of the first wavelength band might not be able to reach the first wavelength conversion material 2412 and may be mixed with the light of the second wavelength band obtained by the first wavelength conversion material 2412, thereby causing color mixing. The filter layer 230 may block the transmission of light still having the first wavelength band even after having passed through the first wavelength conversion layer 241, thereby preventing color mixing and improving color purity.

The first through third wavelength bands may differ from one another. The first wavelength band may have a central wavelength of, for example, about 420 nm to 480 nm. Accordingly, light of the first wavelength band may be blue light. The second wavelength band may have a central wavelength of, for example, about 600 nm to 670 nm. Accordingly, light of the second wavelength band may be red light. The third wavelength region may have a central wavelength of, for example, about 500 nm to 570 nm. Accordingly, light of the third wavelength band may be green light.

Light of the first wavelength band, light of the second wavelength band, and light of the third wavelength band will hereinafter be described as being blue, light, red light, and green light, respectively. The filter layer 230 may block the transmission of blue light and may allow the transmission of red light and green light. That is, the filter layer 230 may be, for example, a blue cutoff filter layer. The filter layer 230 may be formed as a single layer or a multilayer.

The first wavelength conversion layer 241 may be disposed on a surface of the filter layer 230 facing the lower display panel 10, i.e., on the bottom surface of the filter layer 230, and may overlap the first sub-pixel electrode SPE1. The first wavelength conversion layer 241 may include, for example, a first light-transmitting resin 2411 and the first wavelength conversion material 2412.

The first wavelength conversion material 2412 may be distributed in the first light-transmitting resin 2411 and may convert or shift light provided to the first wavelength conversion layer 241 into light of the second wavelength band. The light provided to the first wavelength conversion layer 241 may be light of the first wavelength band, i.e., blue light. Accordingly, the first wavelength conversion layer 241 may receive blue light from an external source and may convert the blue light into red light.

The first wavelength conversion material 2412 may comprise, for example, a first quantum dot. The particle size of the first quantum dot is not particularly important as long as the first wavelength conversion material 2412 can convert light provided by an external source into light of the second wavelength band. The first wavelength conversion material 2412 may be dispersed to be naturally coordinated within the first light-transmitting resin 2411. The type of the first light-transmitting resin 2411 is not particularly important as long as the first light-transmitting resin 2411 is a transparent medium that neither affects the wavelength conversion performance of the first wavelength conversion material 2412, nor causes light absorption.

Examples of the first light-transmitting resin 2411 may include epoxy, polystyrene, and acrylate. The first wavelength conversion layer 241 may include an organic solvent, instead of the first light-transmitting resin 2411. Examples of the organic solvent may include toluene, chloroform, and ethanol.

The second wavelength conversion layer 242 may overlap the second sub-pixel electrode SPE2. The second wavelength conversion layer 242 may include, for example, a second light-transmitting resin 2421 and the second wavelength conversion material 2422.

The second wavelength conversion layer 242 may be disposed on the surface of the filter layer 230 facing the lower display panel 10, i.e., on the bottom surface of the filter layer 230, and may overlap the second sub-pixel electrode SPE2. The second wavelength conversion layer 242 may include, for example, the second light-transmitting resin 2421 and the second wavelength conversion material 2422.

The second wavelength conversion material 2422 may be distributed in the second light-transmitting resin 2421 and may convert or shift light provided to the second wavelength conversion layer 242 into light of the third wavelength band. The light provided to the second wavelength conversion layer 242 may be blue light. Accordingly, the second wavelength conversion layer 242 may receive blue light from an external source and may convert the blue light into green light.

The second wavelength conversion material 2422 may include, for example, a second quantum dot. The particle size of the second quantum dot is not particularly important as long as the second wavelength conversion material 2422 can convert light provided by an external source into light of the third wavelength band. That is, an average particle size of the second wavelength conversion material 2422 may be smaller than an average particle size of the first wavelength conversion material 2412.

The second wavelength conversion material 2422 may be dispersed to be naturally coordinated within the second light-transmitting resin 2421. The type of the second light-transmitting resin 2421 is not particularly important as long as the second light-transmitting resin 2421 is a transparent medium that neither affects the wavelength conversion performance of the second wavelength conversion material 2422, nor causes light absorption.

Examples of the second light-transmitting resin 2421 may include epoxy, polystyrene, and acrylate. The second wavelength conversion layer 242 may include an organic solvent, instead of the second light-transmitting resin 2421. Examples of the organic solvent may include toluene, chloroform, and ethanol.

The first and second quantum dots may be selected from a Group II-VI compound, a Group III-V compound, a Group IV-VI compound, a Group IV element, a Group IV compound, and a combination thereof.

The Group II-VI compound may be selected from: a binary compound selected from CdSe, CdTe, ZnS, ZnSe, ZnTe, ZnO, HgS, HgSe, HgTe, MgSe, MgS, and a combination thereof; a ternary compound selected from CdSeS, CdSeTe, CdSTe, ZnSeS, ZnSeTe, ZnSTe, HgSeS, HgSeTe, HgSTe, CdZnS, CdZnSe, CdZnTe, CdHgS, CdHgSe, CdHgTe, HgZnS, HgZnSe, HgZnTe, MgZnSe, MgZnS, and a combination thereof; and a quaternary compound selected from HgZnTeS, CdZnSeS, CdZnSeTe, CdZnSTe, CdHgSeS, CdHgSeTe, CdHgSTe, HgZnSeS, HgZnSeTe, HgZnSTe, and a combination thereof.

The Group III-V compound may be selected from: a binary compound selected from GaN, GaP, GaAs, GaSb, AlN, AlP, AlAs, AlSb, InN, InP, InAs, InSb, and a combination thereof; a ternary compound selected from GaNP, GaNAs, GaNSb, GaPAs, GaPSb, AlNP, AlNAs, AlNSb, AlPAs, AlPSb, InNP, InNAs, InNSb, InPAs, InPSb, GaAlNP, and a combination thereof; and a quaternary compound selected from GaAlNAs, GaAlNSb, GaAlPAs, GaAlPSb, GaInNP, GaInNAs, GaInNSb, GaInPAs, GaInPSb, InAlNP, InAlNAs, InAlNSb, InAlPAs, InAlPSb, and a combination thereof.

The Group IV-VI compound may be selected from: a binary compound selected from SnS, SnSe, SnTe, PbS, PbSe, PbTe, and a combination thereof; a ternary compound selected from SnS, SnSe, SnTe, PbS, PbSe, PbTe, and a combination thereof; and a quaternary compound selected from SnPbSSe, SnPbSeTe, SnPbSTe, and a combination thereof. The Group IV element may be selected from Si, Ge, and a combination thereof. The Group IV compound may be a binary compound selected from SiC, SiGe, and a combination thereof.

The binary compound, the tertiary compound, or the quaternary compound may be present in particles at a uniform concentration, or may be present in particles having locally different concentration distributions. The first and second quantum dots may have a core/shell structure where one quantum dot surrounds another quantum dot. An interface between the core and the shell may have a concentration gradient in which the concentration of an element of the shell decreases closer to the center.

The Full Width at Half Maximum (FWHM) of the first and second quantum dots may be about 45 nm, preferably, about 40 nm, and more preferably, about 30 nm. At this FWHM, color purity or color reproducibility may be improved. In addition, light emitted through the first and second quantum dots can be emitted in all directions, and thus, a wide viewing angle can be improved.

Each of the first and second quantum dots may be, for example, a spherical, pyramid-shaped, multi-armed, or cubic nanoparticle, nanotube, nanowire, nanofiber, or nanoplate particle.

Alternatively, the first and second wavelength conversion materials 2412 and 2422 may include, for example, a fluorescent substance, a quantum rod, or a phosphor, instead of a quantum dot. The fluorescent substance may have a size of, for example, about 100 nm to 3000 nm. Examples of the fluorescent substance may include yellow, green, and red fluorescent substances.

That is, the first and second wavelength conversion materials 2412 and 2422 may absorb light provided to the first and second wavelength conversion layers 241 and 242, respectively, and may emit light of a different central wavelength from the absorbed light. Specifically, the first and second wavelength conversion materials 2412 and 2422 may scatter and emit light incident upon the first and second wavelength conversion layers 241 and 242, respectively, in various directions regardless of the incidence angle of the light. That is, the display device can emit light in various directions through the first and second wavelength conversion materials 2412 and 2422 and can thus improve a wide viewing angle.

Light emitted from the first and second wavelength conversion layers 241 and 242 may be depolarized and may thus be in an unpolarized state. The term "unpolarized light," as used herein, means light not consisting only of components polarized in a particular direction, i.e., light consisting of components that are randomly polarized. Unpolarized light may be, for example, natural light.

A first cholesteric liquid crystal layer 251 is disposed on a surface of the first wavelength conversion layer 241 facing the lower substrate 110, i.e., on the bottom surface of the first wavelength conversion layer 241. The first cholesteric liquid crystal layer 251 may be disposed to overlap the first wavelength conversion layer 241 and the first sub-pixel electrode SPE1.

The first cholesteric liquid crystal layer 251 may transmit light of, for example, the first wavelength range, therethrough and may reflect light of, for example, the second wavelength range. That is, the first cholesteric liquid crystal layer 251 may transmit blue light therethrough and may reflect red light. Accordingly, the first cholesteric liquid crystal layer 251 can improve the efficiency of outputting light emitted from the first wavelength conversion layer 241.

Specifically, the first cholesteric liquid crystal layer 251 may transmit therethrough blue light received from a direction in which the lower display panel 10 is disposed and may provide the blue light to the first wavelength conversion layer 241. The blue light provided to the first wavelength conversion layer 241 is converted into red light by the first wavelength conversion material 2412 and is emitted in a direction in which the upper substrate 210 is disposed, i.e., in an outward direction. The first cholesteric liquid crystal layer 251 may reflect red light traveling in the direction in which the lower display panel 10 is disposed, rather than in the direction in which the upper substrate 210 is disposed, so that the red light can be emitted outward.

More specifically, the first cholesteric liquid crystal layer 251 has the property of transmitting left-handed polarized light therethrough and the property of reflecting right-handed polarized light. In fact, since the light emitted from the first wavelength conversion layer 241 may be depolarized and may thus be in an unpolarized state, as already mentioned above, some of the red light emitted from the first wavelength conversion layer 241 in a direction in which the first cholesteric liquid crystal layer 251 is disposed, particularly, red light having right-handed polarized components, may be reflected by the first cholesteric liquid crystal layer 251 and may thus travel back in a direction in which the first wavelength conversion layer 241 is disposed.

The peak wavelength of light reflected by the first cholesteric liquid crystal layer 251 may be determined by Equation (1):

$$\lambda rp1 = (ne1 + n01)/2 * p1 \quad (1)$$

where $\lambda rp1$ denotes the peak wavelength of the light reflected by the first cholesteric liquid crystal layer 251, ne1 denotes the extraordinary reactive refractive index of cholesteric liquid crystal molecules included in the first cholesteric liquid crystal layer 251, n01 denotes the ordinary refractive index of the cholesteric liquid crystal molecules, and p1 denotes the pitch of a helical structure formed by the cholesteric liquid crystal molecules. Here, the pitch of the helical structure is the distance required for the directors of the cholesteric liquid crystal molecules to make one revolution along a spiral.

The first cholesteric liquid crystal layer 251 may include a plurality of cholesteric liquid crystal molecules and impurities. The first cholesteric liquid crystal layer 251 may further include a reactive monomer for fixing the cholesteric liquid crystal molecules. The extraordinary refractive index ne1 and the ordinary refractive index no1 may vary depending on the size and the type of the cholesteric liquid crystal molecules, and the pitch p1 may vary depending on the concentration or the type of the impurities. The impurities may generally include nematic molecules having chiral properties, but other compositions and/or other properties are possible.

The peak wavelength $\lambda rp1$ may be determined to fall within a range of about 600 nm to 670 nm. That is the peak wavelength $\lambda rp1$ may fall within the second wavelength band, and may be the same as the wavelength of red light. Accordingly, the first cholesteric liquid crystal layer 251 can reflect right-handed polarized components of red light.

The first cholesteric liquid crystal layer 251 may be formed by an inkjet or other known process. That is, the first cholesteric liquid crystal layer 251 may be fabricated by an inkjet process using the barriers formed by the light-shielding member 220 during the fabrication of the upper display panel 20. A distance h2 from the bottom surface of the upper substrate 210 to the bottom surface of the second wavelength conversion layer 242 may be smaller than the height h1 of the light-shielding member 220. In other words, the height h1 to which the light-shielding member 220 protrudes in the direction in which the lower display panel 10 is disposed may be greater than the distance h2 from the bottom surface of the upper substrate 210 to the bottom surface of the second wavelength conversion layer 242.

The second cholesteric liquid crystal layer 252 is disposed on a surface of the second wavelength conversion layer 242 facing the lower substrate 110, i.e., on the bottom surface of the first wavelength conversion layer 241. The second cholesteric liquid crystal layer 252 may be disposed to overlap the second wavelength conversion layer 242 and the second sub pixel electrode SPE2.

The second cholesteric liquid crystal layer 252 may transmit light of, for example, the first wavelength range, therethrough and may reflect light of, for example, the third wavelength range. That is, the second cholesteric liquid crystal layer 252 may transmit blue light therethrough and may reflect green light. Accordingly, the second cholesteric liquid crystal layer 252 can improve the efficiency of outputting light emitted from the second wavelength conversion layer 242.

Specifically, the second cholesteric liquid crystal layer 252 may transmit therethrough blue light from the direction in which the lower display panel 10 is disposed and may provide the blue light to the second wavelength conversion layer 242. The blue light provided to the second wavelength conversion layer 242 is converted into green light by the second wavelength conversion material 2422 and is emitted in the direction in which the upper substrate 210 is disposed, i.e., in the outward direction. The second cholesteric liquid crystal layer 252 may reflect some of the green light obtained by the second wavelength conversion material 2422, particularly, green light traveling in the direction in which the lower display panel 10 is disposed (rather than in the direction in which the upper substrate 210 is disposed) so that the green light can be emitted outward.

The peak wavelength of light reflected by the second cholesteric liquid crystal layer 252 may be determined by Equation (2):

$$\lambda rp2 = (ne2 + n02)/2 * p2 \qquad (2)$$

where $\lambda rp2$ denotes the peak wavelength of the light reflected by the second cholesteric liquid crystal layer 252, ne2 denotes the extraordinary reactive refractive index of cholesteric liquid crystal molecules included in the second cholesteric liquid crystal layer 252, n02 denotes the ordinary refractive index of the cholesteric liquid crystal molecules, and p2 denotes the pitch of a helical structure formed by the cholesteric liquid crystal molecules.

The peak wavelength $\lambda rp2$ may be determined to fall within a range of about 500 nm to 570 nm, whereas the peak wavelength $\lambda rp1$ may be determined to fall within a range of about 600 nm to 670 nm. That is the peak wavelength $\lambda rp2$ may fall within the third wavelength band, and may be the same as the wavelength of green light. Accordingly, the second cholesteric liquid crystal layer 252 can reflect right-handed polarized components of green light. The first and second cholesteric liquid crystal layers 251 and 252 may be obtained by making the concentration of impurities included in the first cholesteric liquid crystal layer 251 and the concentration of impurities included in the second cholesteric liquid crystal layer 252 differ from each other. The first and second cholesteric liquid crystal layers 251 and 252 may also have different types of impurities included therein. The first and second cholesteric liquid crystal layers 251 and 252 may also have different chemical and physical properties of cholesteric liquid crystal molecules included therein.

The display device includes the filter layer 230, the first cholesteric liquid crystal layer 251, and the second cholesteric liquid crystal layer 252 and can thus prevent color mixing. Also, the display device can improve color reproducibility by improving the efficiency of outputting light emitted from the first or second wavelength conversion layer 241 or 242.

The first cholesteric liquid crystal layer 251 may reflect light of the second wavelength band, and the second cholesteric liquid crystal layer 252 may reflect light of the third wavelength band. Alternatively, the first cholesteric liquid crystal layer 251 may reflect both light of the second wavelength band and light of the third wavelength band, and the second cholesteric liquid crystal layer 252 may also reflect both light of the second wavelength band and light of the third wavelength band. In this case, the first and second cholesteric liquid crystal layers 251 and 252 may have a structure in which the pitch of the helical structure formed by the cholesteric liquid crystal molecules of each of the first and second cholesteric liquid crystal layers 251 and 252 varies, i.e., a multi-pitch structure. The range of wavelengths that can be reflected by the first and second cholesteric liquid crystal layers 251 and 252 may be controlled by adding multiple types of impurities to the first and second cholesteric liquid crystal layers 251 and 252.

The reflectance of the first cholesteric liquid crystal layer 251 for light vertically incident on the first cholesteric liquid crystal layer 251 and the reflectance of the first cholesteric liquid crystal layer 251 for light obliquely incident on the first cholesteric liquid crystal layer 251 may differ from each other. The cholesteric liquid crystal molecules included in the first cholesteric liquid crystal layer 251 may be formed to have a multi-pitch structure to improve the reflectance of the first cholesteric liquid crystal layer 251. The range of wavelengths that can be reflected by the first cholesteric liquid crystal layer 251 can be controlled by diversifying the type of impurities included in the first cholesteric liquid crystal layer 251. This technique is also applicable to the second cholesteric liquid crystal layer 252.

The transmissive layer 243 is disposed on the surface of the upper substrate 210 facing the lower display panel 10, i.e., on the bottom surface of the upper substrate 210, and overlaps with the third sub-pixel SPX3. The transmissive layer 243 may include a third light-transmitting resin 2431 and a light-scattering material 2432.

The light-scattering material 2432 may be dispersed in the third light-transmitting resin 2431 and may scatter and emit light provided to the transmissive layer 243. Specifically, the light-scattering material 2432 may scatter and emit light of the first wavelength band (i.e., blue light) provided to the transmissive layer 243. The light-scattering material 2432 may scatter and emit the light provided to the transmissive layer 243 in various directions regardless of the incidence angle of the light. The light emitted by the light-scattering material 2432 may be depolarized and may thus be in an unpolarized state.

The light-scattering material 2432 may be, for example, a material having a different refractive index from the third light-transmitting resin 2431. For example, the light-scattering material 2432 may be one of $TiO_2$, $ZrO_2$, $Al_2O_3$, $In_2O_3$, ZnO, $SnO_2$, $Sb_2O_3$, and ITO, or some other composition. That is, any material that can scatter light incident thereupon may be used as the light-scattering material 2432.

A planarization layer 260 is disposed on surfaces of the first cholesteric liquid crystal layer 251, the second cholesteric liquid crystal layer 252, and the transmissive layer 243 facing the lower display panel 10, i.e., on the bottom surfaces of the first cholesteric liquid crystal layer 251, the second cholesteric liquid crystal layer 252, and the transmissive layer 243.

The planarization layer 260 may be formed of, for example, an organic material. When the first wavelength conversion layer 241, the second wavelength conversion layer 242, and the transmissive layer 243 have different thicknesses and height differences are formed due to the presence of the light-shielding member 220, the planarization layer 260 may remove height differences among the elements formed on a surface of the upper substrate 210, particularly, on the bottom surface of the upper substrate 210, and may thus planarize the bottom surface of the upper substrate 210.

A second insulating layer 270 may be disposed on a surface of the planarization layer 260 facing the lower display panel 10, i.e., on the bottom surface of the planarization layer 260. The second insulating layer 270 may be formed of an inorganic insulating material such as silicon nitride or silicon oxide. Moreover, the second insulating layer 270 may be omitted.

A second polarizing layer 280 is disposed on a surface of the second insulating layer 270 facing the lower display panel 10, i.e., on the bottom surface of the second insulating layer 270. The second polarizing layer 280 may include, for example, a conductive material through which a current may flow. Examples of the conductive material may include a metal such as Al, Ag, gold (Au), copper (Cu), or nickel (Ni). Examples of the conductive material may further include titanium (Ti) and molybdenum (Mo).

The second polarizing layer 280 may be, for example, a wire grid polarizer. Accordingly, the second polarizing layer 280 may include a plurality of linear grid patterns protruding in a direction in which the lower display panel 10 is disposed.

Specifically, when light provided to the second polarizing layer 280 passes through the second polarizing layer 280, components of light parallel to the second polarizing layer 280 are absorbed or reflected, and only components of light perpendicular to the second polarizing layer 280 are transmitted through the second polarizing layer 280, thereby obtaining polarized light. The larger the distance between the linear grid patterns of the second polarizing layer 280, the more efficient the polarization of light by the second polarizing layer 280 can be. The second polarizing layer 280 may be formed by, for example, nanoimprinting.

A capping layer 290 may be disposed on a surface of the second polarizing layer 280 facing the lower display panel 10, i.e., on the bottom surface of the second polarizing layer 280. The capping layer 290 may prevent defects such as corrosion of the second polarizing layer 280 and may planarize a surface of the second polarizing layer 280, particularly, the bottom surface of the second polarizing layer 280.

A common electrode 300 may be disposed on a surface of the capping layer 290 facing the lower display panel 10, i.e., on the bottom surface of the capping layer 290. The common electrode 300 may at least partially overlap the first through third sub-pixel electrodes SPE1 through SPE3. The common electrode 300 may be formed as, for example, a plate. The common electrode 300 may be formed of a transparent conductive material such as ITO and IZO or a reflective metal such as Al, Ag, Cr, or an alloy thereof.

A second alignment film 310 may be disposed on a surface of the common electrode 300 facing the lower display panel 10, i.e., on the bottom surface of the common electrode 300. The second alignment film 310 may be formed of polyimide or the like. The second alignment film 310 may be omitted.

The liquid crystal layer 40 will hereinafter be described.

The liquid crystal layer 40 includes the liquid crystal molecules 41. The liquid crystal molecules 41 may have, for example, negative dielectric anisotropy. The liquid crystal molecules 41 may thus be aligned in a direction perpendicular to the lower substrate 110 in the absence of an electric field in the liquid crystal layer 40. In response to an electric field being formed between the lower substrate 110 and the upper substrate 210, the liquid crystal molecules 41 can be rotated or tilted in a particular direction and may thus change the polarization of light provided to the liquid crystal layer 40.

An exemplary method of fabricating the upper display panel 20 hereinafter be described with reference to FIGS. 3 through 7.

In the description of FIGS. 3 through 7, the terms "top", "bottom", "upper", and "lower" are defined and used with respect to the orientations shown in FIGS. 3 through 7. Thus, the terms "top", "bottom", "upper", and "lower" may refer to different directions in the description of FIGS. 3 through 7 than corresponding directions in the description of FIG. 1. Thus, a lower portion of FIGS. 3 through 7 may correspond to an upper portion of FIG. 1, and an upper portion of FIGS. 3 through 7 may correspond to a lower portion of FIG. 1. The upper display panel 20 of FIGS. 3 through 7 may be obtained by rotating the upper display panel 20 of FIG. 1 by 180 degrees.

Figure 3:
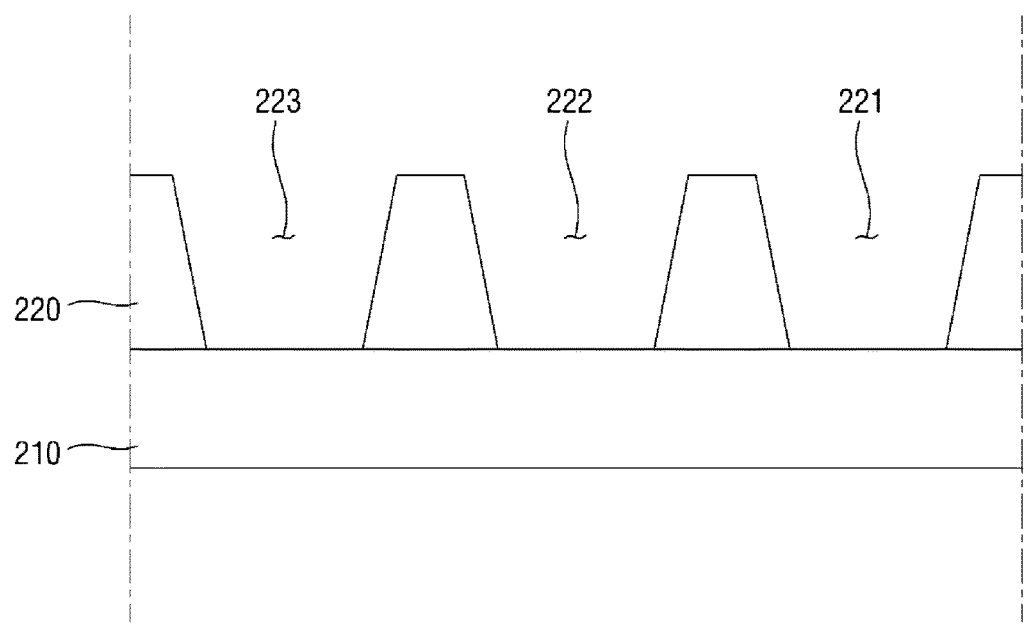
FIGS. 3 through 7 are cross-sectional views illustrating an upper substrate of the display device of FIG. 1 during various stages in an exemplary method of manufacturing the display device according to the invention.

Referring to FIG. 3, the upper substrate 210 is prepared.

Thereafter, the light-shielding member 220, which performs the function of barriers, is formed on the upper substrate 210. The light-shielding member 220 may be formed of a photosensitive organic material.

Specifically, a photosensitive organic material layer is formed by applying a photosensitive organic material capable of blocking light on the upper substrate 210, and the photosensitive organic material layer is exposed to ultraviolet (UV) light using a mask having patterns corresponding to the light-shielding member 220. Thereafter, the light-shielding member 220, which performs the function of barriers, may be obtained by removing the photosensitive organic material layer. As a result, first through third hole regions 221 through 223, which are separate from one another, may be formed by the light-shielding member 220. Since FIGS. 3 through 7 illustrate only part of the upper display panel 20, only three hole regions, i.e., the first through third hole regions 221 through 223, are illustrated in FIGS. 3 through 7, but more than three hole regions may actually be formed on the upper display panel 20. The hole regions of the upper display panel 20 will hereinafter be described, taking the first through third hole regions 221 through 223. The first hole region 221 may be a region overlapping the first sub-pixel SPX1 of FIG. 1, the second hole region 222 may be a region overlapping the second sub-pixel SPX2 of FIG. 1, and the third hole region 223 may be a region overlapping the third sub-pixel SPX3 of FIG. 1.

Figure 4:
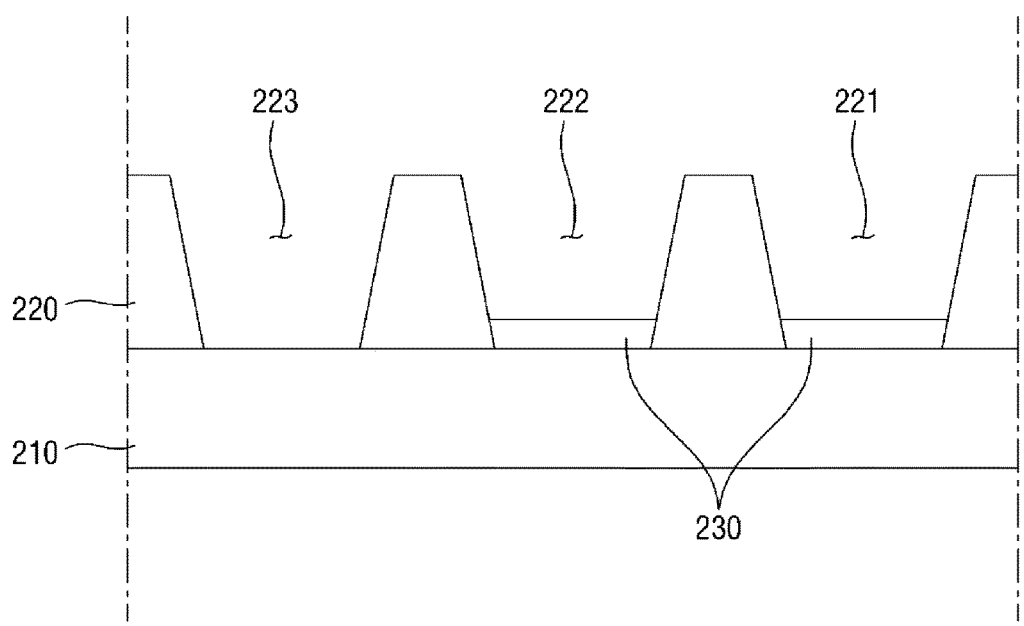

Thereafter, referring to FIG. 4, the filter layer 230 is formed in the first and second hole regions 221 and 222.

Figure 5:
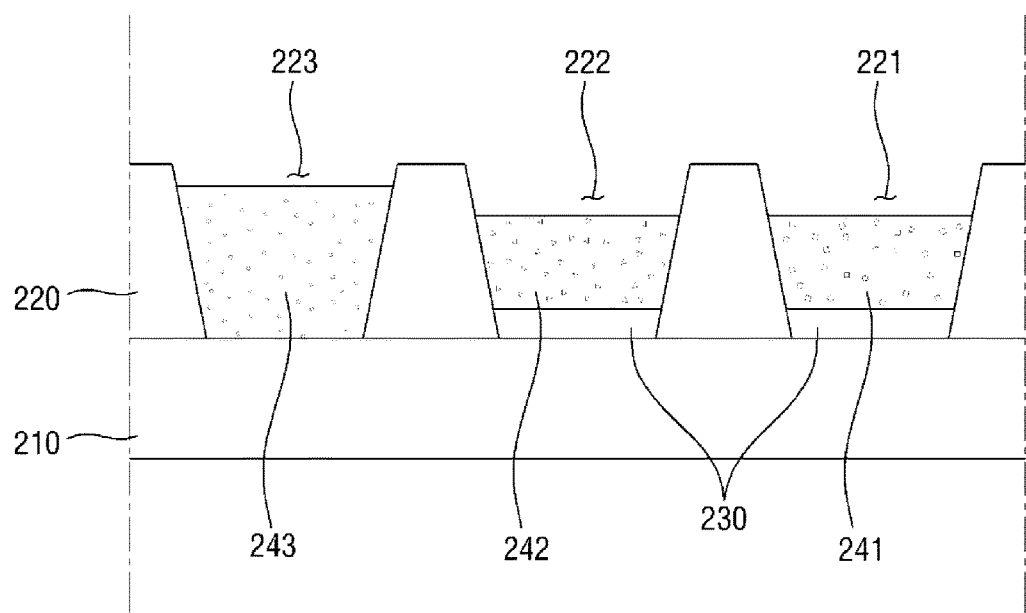

Thereafter, referring to FIG. 5, the first wavelength conversion layer 241 is formed in the first hole region 221, the second wavelength conversion layer 242 is formed in the second hole region 222, and the transmissive layer 243 is formed in the third hole region 223. The first and second cholesteric liquid crystal layers 251 and 252 will be formed on the first and second wavelength conversion layers 241 and 242, respectively, which are disposed in the first and second hole regions 221 and 222, respectively, whereas no cholesteric liquid crystal layer is formed on the transmissive layer 243, which is disposed in the third hole region 223. Thus, the top surface of the transmissive layer 243 may be higher than the top surfaces of the first and second wavelength conversion layers 241 and 242. In other words, the transmissive layer 243 may be thicker than the first and second wavelength conversion layers 241 and 242.

Figure 6:
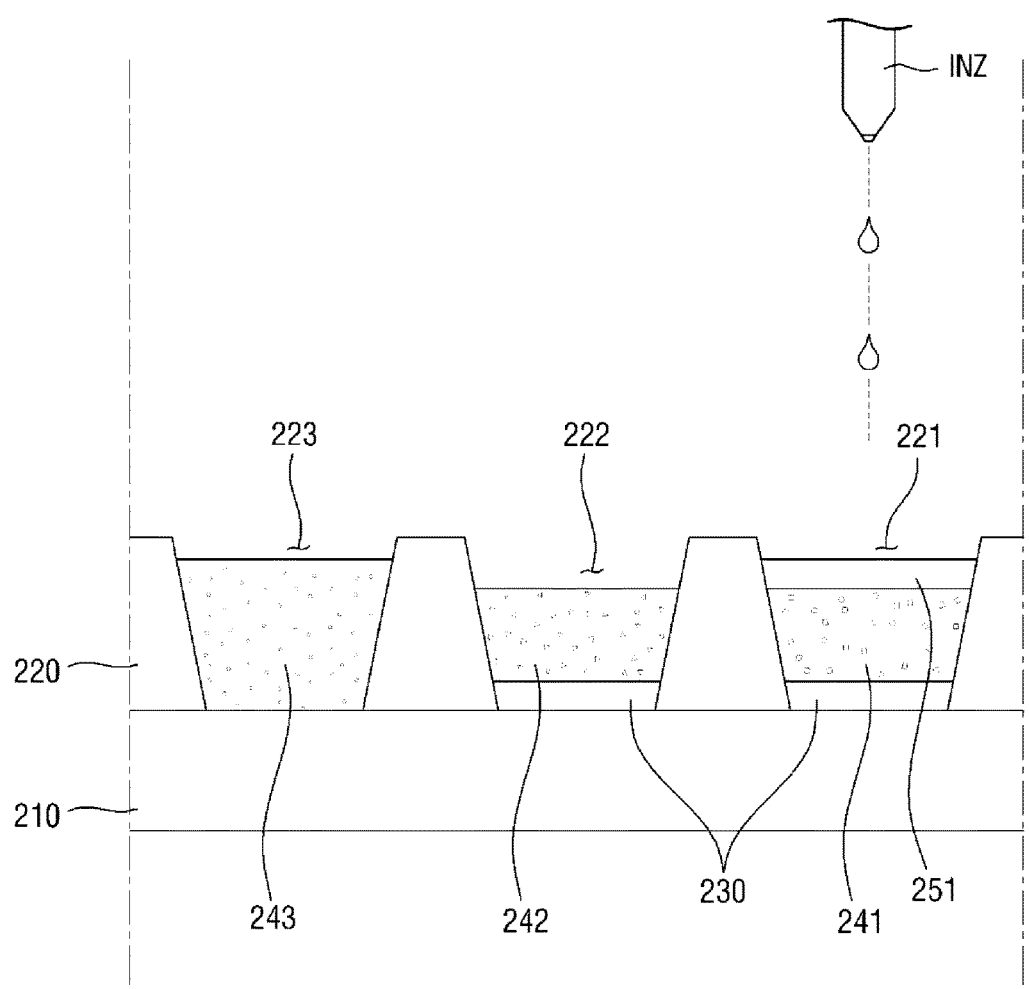

Thereafter, referring to FIG. 6, the first cholesteric liquid crystal layer 251 is formed on the first wavelength conversion layer 241, which is formed in the first hole region 221. The first cholesteric liquid crystal layer 251 may be formed by an inkjet or other known process. Specifically, the cholesteric liquid crystal molecules and the impurities of the first cholesteric liquid crystal layer 251 may be sprayed into the first hole region 221 in the form of ink through an inkjet nozzle INZ.

Figure 7:
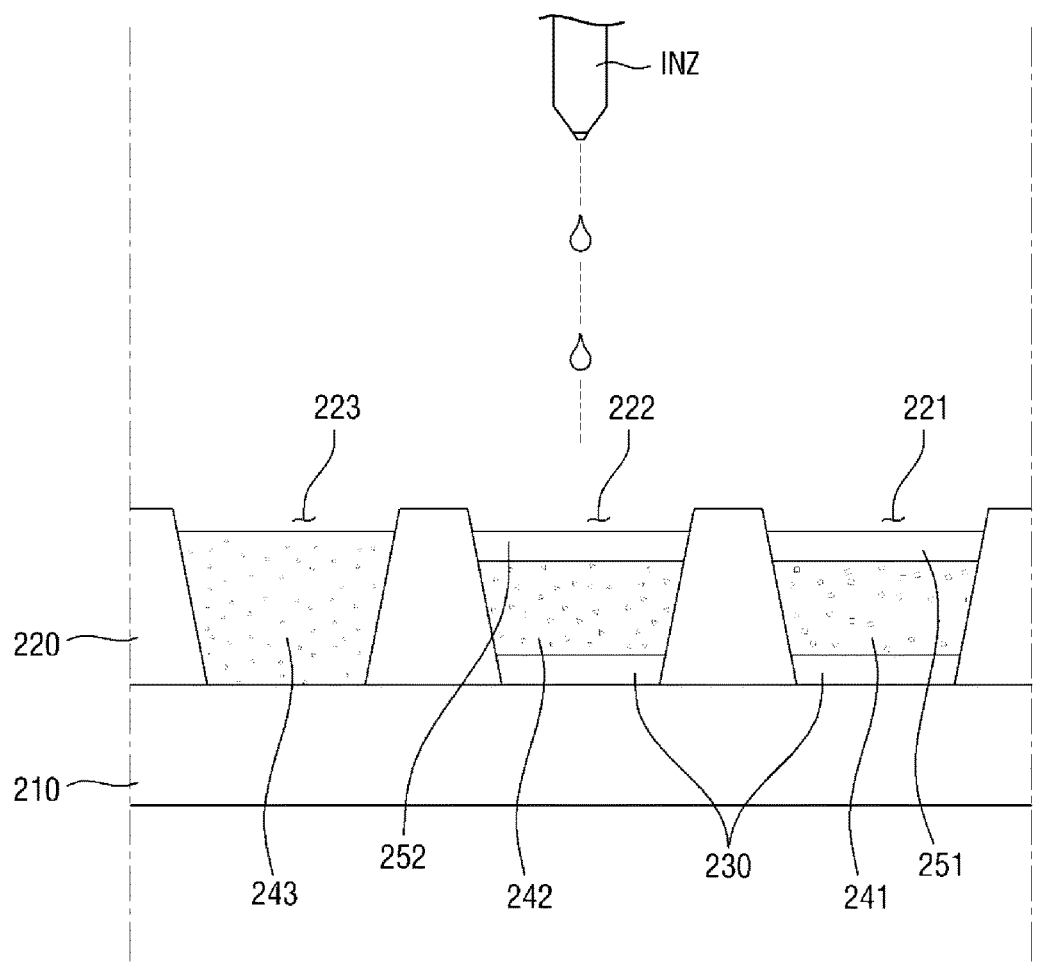

Thereafter, referring to FIG. 7, the second cholesteric liquid crystal layer 252 is formed on the second wavelength conversion layer 242, which is formed in the second hole region 222. The second cholesteric liquid crystal layer 252 may be formed by an inkjet or other known process. Specifically, the cholesteric liquid crystal molecules and the impurities of the second cholesteric liquid crystal layer 252 may be sprayed into the second hole region 222 in the form of ink through the inkjet nozzle INZ.

Since the first and second cholesteric liquid crystal layers 251 and 252 can be formed by an inkjet process, rather than by a Chemical Vapor Deposition (CVD) process, which is more costly, the manufacturing cost of the display device can be reduced as compared to device where layers that perform the functions of the first and second cholesteric liquid crystal layers 251 and 252 are formed by CVD or other similar methods.

After the spraying of the materials of each of the first and second cholesteric liquid crystal layers 251 and 252, a process of curing reactive monomers, included in each of the first and second cholesteric liquid crystal layers 251 and 252 through the irradiation of UV light so as to fix the cholesteric liquid crystal molecules of each of the first and second cholesteric liquid crystal layers 251 and 252, may be additionally performed.

After the formation of the first and second cholesteric liquid crystal layers 251 and 252, the planarization layer 260, the second liquid crystal layer 270, the second polarizing layer 280, the capping layer 290, the common electrode 300, and the second alignment film 310 may be formed in accordance with known techniques, thereby obtaining the upper display panel 20 of FIG. 1.

Figure 8:
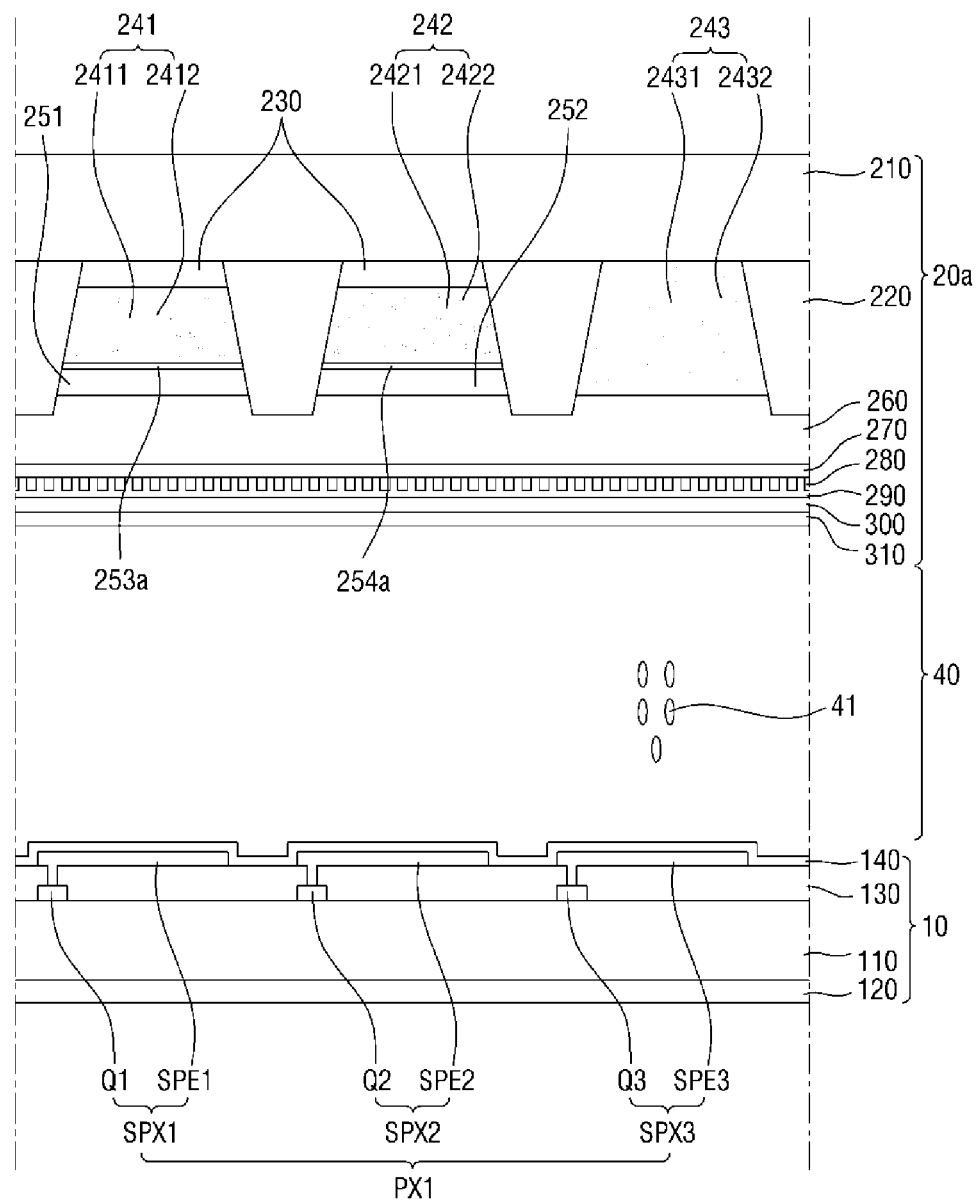
FIG. 8 is a cross-sectional view of a second embodiment of a display device constructed according to the principles of the invention.

Referring to FIG. 8, the display device will hereinafter be described, focusing mainly on differences with the display device of FIG. 1.

In FIG. 8, a third alignment film 253a is disposed on a surface of a first wavelength conversion layer 241 facing an upper substrate 210, i.e., on the top surface of the first wavelength conversion layer 241. The third alignment film 253a may be formed of polyimide or the like and may control the alignment of cholesteric liquid crystal molecules included in a first cholesteric liquid crystal layer 251. The third alignment film 253a may be formed by a rubbing process or a photo-alignment process.

A fourth alignment film 254a is disposed on a surface of a second wavelength conversion layer 242 facing the upper substrate 210, i.e., on the top surface of the second wavelength conversion layer 242. The fourth alignment film 254a may be formed of polyimide or the like and may control the alignment of cholesteric liquid crystal molecules included in a second cholesteric liquid crystal layer 252. The fourth alignment film 254a may be formed by a rubbing process or a photo-alignment process.

As described above, an upper display panel 20a of the display device, unlike the upper display panel 20 of the display device of FIG. 1, further includes the third and fourth alignment films 253a and 254a. Accordingly, the function of the first and second cholesteric liquid crystal layers 251 and 252, i.e., the function of preventing color mixing, can be improved.

Figure 9:
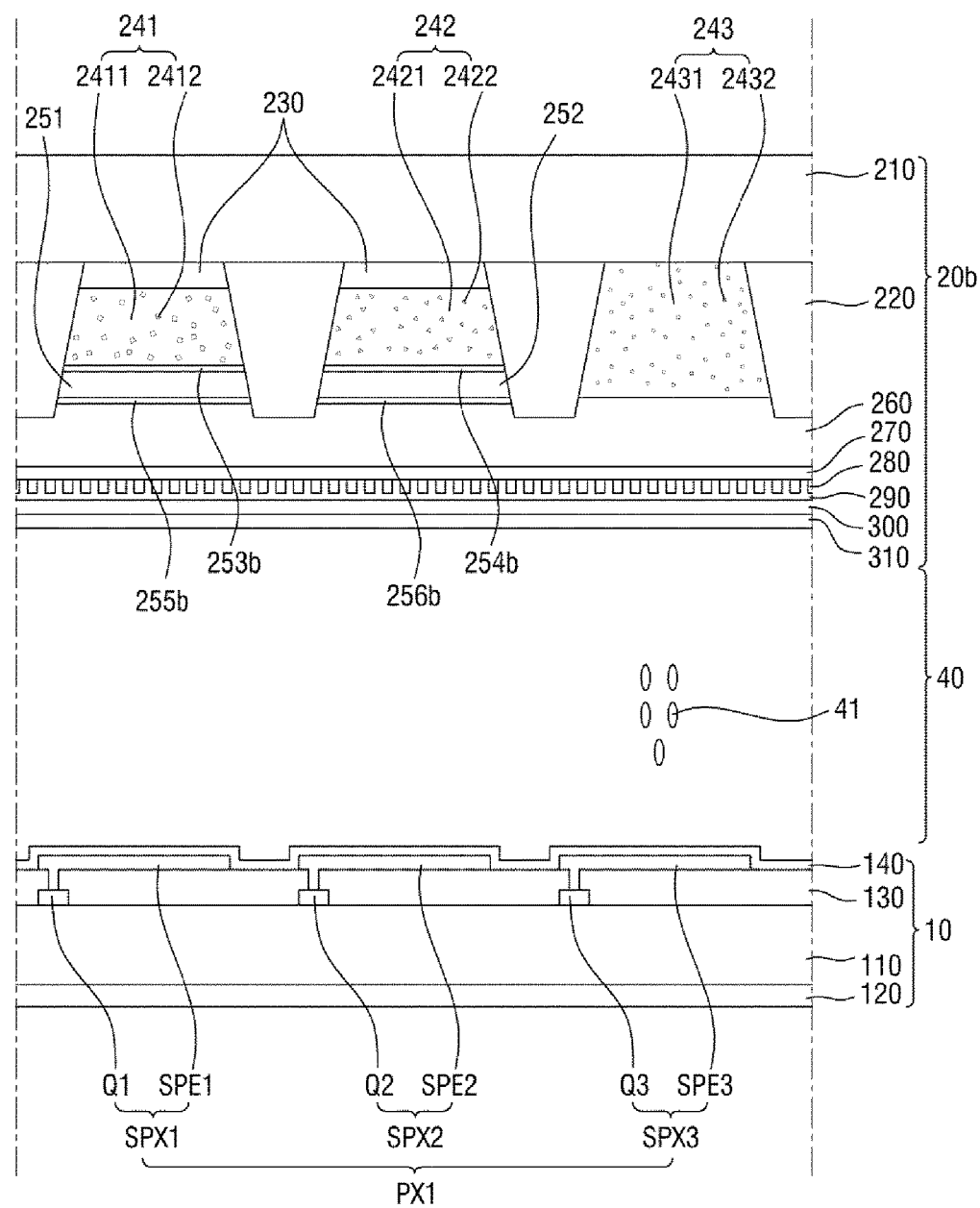
FIG. 9 is a cross-sectional view of a third embodiment of a display device constructed according to the principles of the invention.

Referring to FIG. 9, the display device will hereinafter be described, focusing mainly on differences with the display devices of FIGS. 1 and 8.

In FIG. 9, a fifth alignment film 255b is disposed on a surface of a first wavelength conversion layer 241 facing a lower display panel 10, i.e., on the bottom surface of the first wavelength conversion layer 241. The fifth alignment film 255b may be formed of polyimide or the like and may control the alignment of cholesteric liquid crystal molecules included in a first cholesteric liquid crystal layer 251. The fifth alignment film 255b may be formed by a rubbing process or a photo-alignment process.

A sixth alignment film 256b is disposed on a surface of a second wavelength conversion layer 242 facing the lower display panel 10, i.e., on the bottom surface of the second wavelength conversion layer 242. The sixth alignment film 256b may be formed of polyimide or the like and may control the alignment of cholesteric liquid crystal molecules included in a second cholesteric liquid crystal layer 252. The sixth alignment film 256b may be formed by a rubbing process or a photo-alignment process.

As described above, in an upper display panel 20b of the display device, two alignment films are formed on both surfaces of each of the first and second wavelength conversion layers 241 and 242, whereas in the upper display panel 20a of the display device of FIG. 8, an alignment film is formed on only one surface of each of the first and second wavelength conversion layers 241 and 242. Accordingly, the function of the first and second cholesteric liquid crystal layers 251 and 252, i.e., the function of preventing color mixing, can be further improved.

Figure 10:
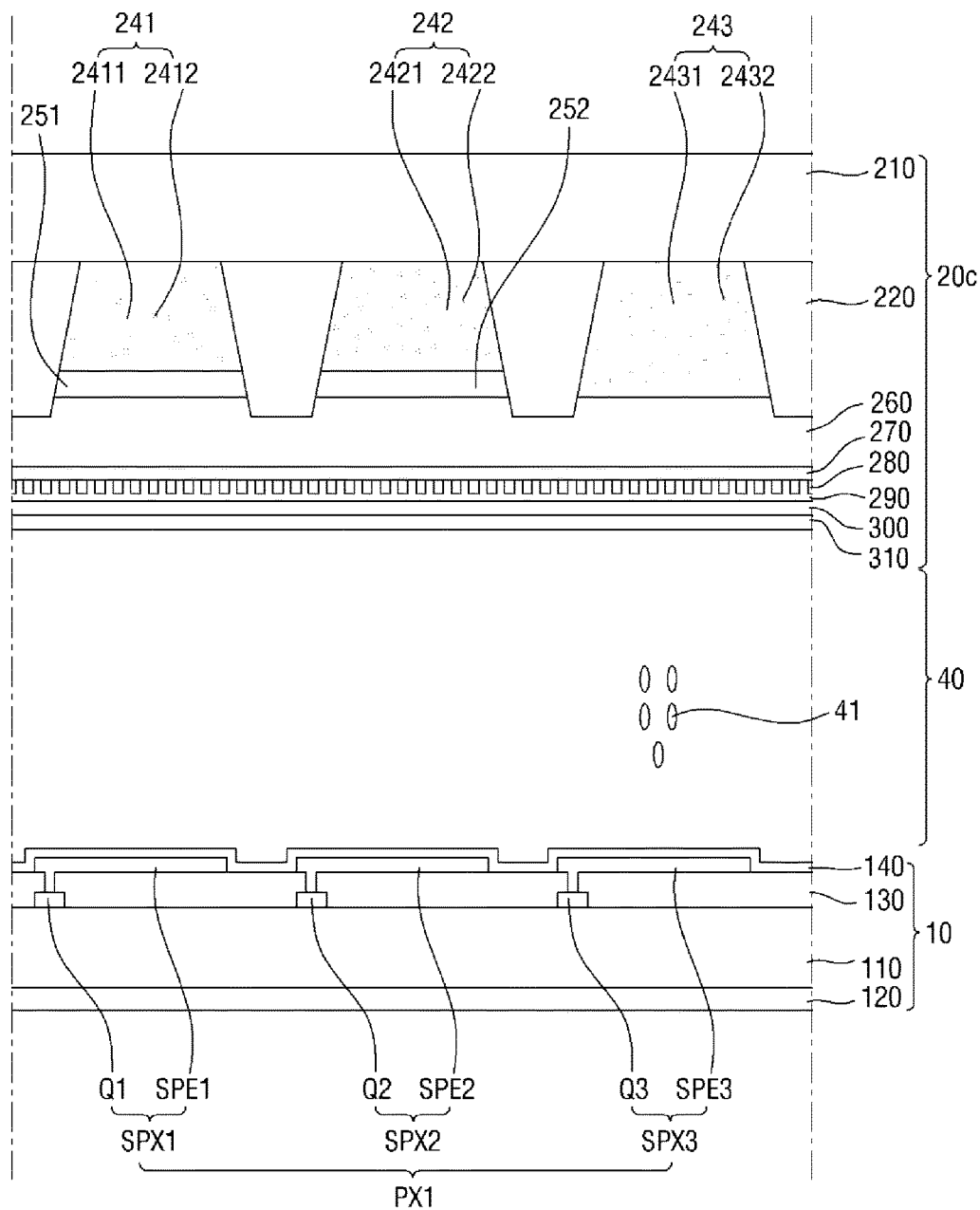
FIG. 10 is a cross-sectional view of a fourth embodiment of a display device constructed according to the principles of the invention.

Referring to FIG. 10, the display device will hereinafter be described, focusing mainly on differences with the display device of FIG. 1.

In FIG. 10, first and second wavelength conversion layers 241 and 242 may be formed on a surface of an upper substrate 210 where a light-shielding member 220 is not formed, i.e., on the bottom surface of the upper substrate 210. That is, the filter layer 230 of FIG. 1 may be omitted.

Figure 11:
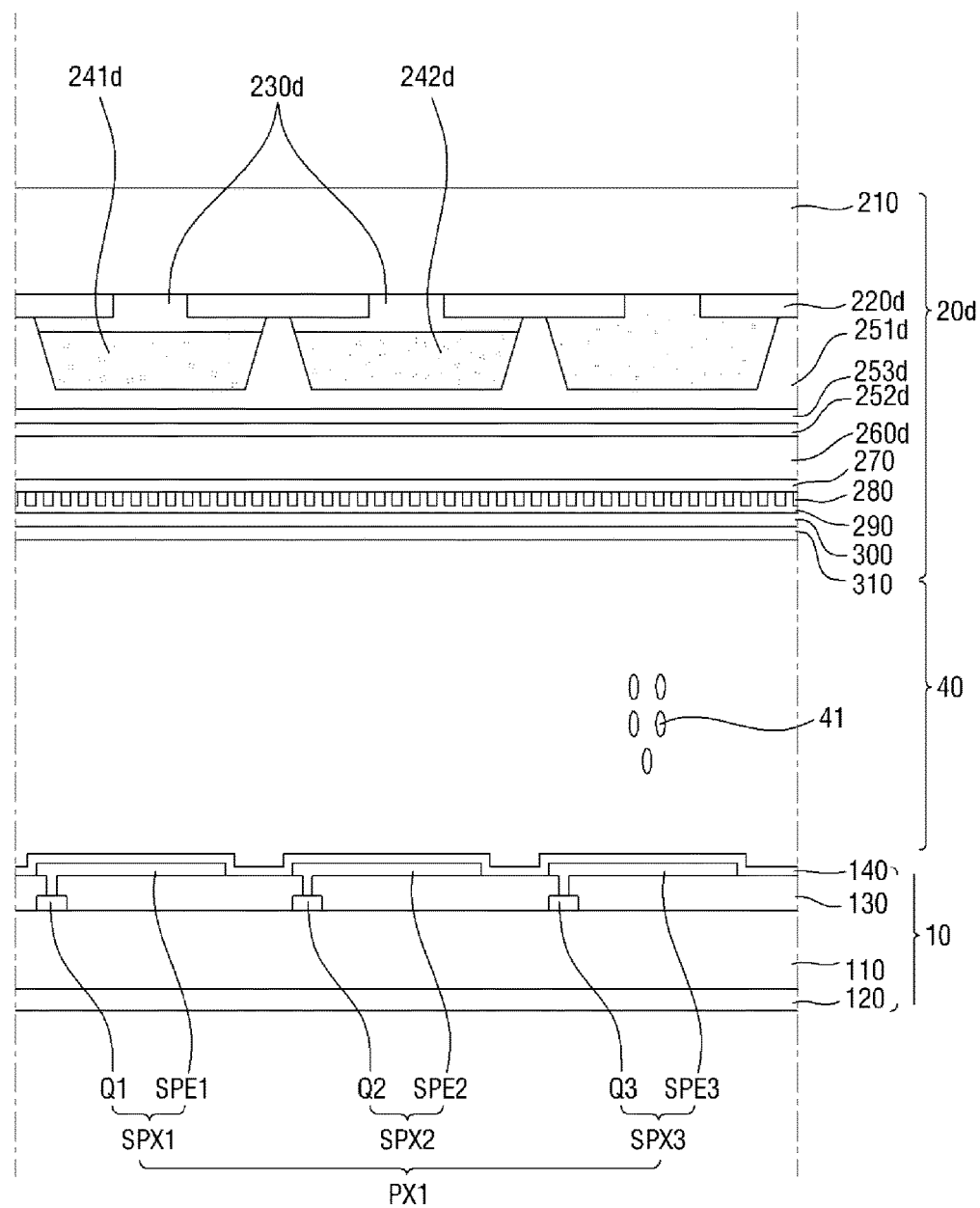
FIG. 11 is a cross-sectional view of a fifth embodiment of a display device constructed according to the principles of the invention.

Referring to FIG. 11, the display device will hereinafter be described, focusing mainly on differences with the display device of FIG. 1.

In FIG. 11, a light-shielding member 220d, which blocks the transmission of light in a region other than a pixel region, is disposed on a surface of an upper substrate 210 facing a lower display panel 10, i.e., on the bottom surface of the upper substrate 210. The light-shielding member 220d may be formed of a metal material, whereas the light-shielding member 220 of FIG. 1 may be formed of an organic material. Accordingly, the light-shielding member 220d may be formed to be thinner than the light-shielding member 220 of FIG. 1.

The light-shielding member 220d may include a plurality of openings. The openings may overlap first through sub-pixel electrodes SPE1 through SPE3, respectively, in a vertical direction with respect to a lower substrate 110.

A filter layer 230d is disposed on a surface of the light-shielding member 220d facing a lower display panel 10, i.e., on the bottom surface of the light-shielding member 220d. The filter layer 230d may be disposed on at least part of the bottom surface of the light-shielding member 220d and may also be disposed on part of the upper substrate 210 where the light-shielding member 220d is not provided.

A first wavelength conversion layer 241d may be disposed on a surface of the filter layer 230d facing the lower display panel 10, i.e., on the bottom surface of the filter layer 230d, and may overlap the first sub-pixel electrode SPE1.

A second wavelength conversion layer 242d may be disposed on the surface of the filter layer 230d facing the lower display panel 10, i.e., on the bottom surface of the filter layer 230d, and may overlap the second sub-pixel electrode SPE2.

A first cholesteric liquid crystal layer 251d is disposed on surfaces of the first and second wavelength conversion layers 241d and 242d facing the lower display panel 10, i.e., on the bottom surfaces of the first and second wavelength conversion layers 241d and 242d. The first cholesteric liquid crystal layer 251d may be formed by an inkjet process or an application process. Since the light-shielding member 220d, unlike the light-shielding member 220 of FIG. 1, does not perform the function of one or more barriers, the first cholesteric liquid crystal layer 251d may be formed on the entire bottom surface of the upper substrate 210, rather than on part of the bottom surface of the upper substrate 210.

A blocking layer 253d is disposed on a surface of the first cholesteric liquid crystal layer 251d facing the lower display panel 10, i.e., on the bottom surface of the first cholesteric liquid crystal layer 251d. The blocking layer 253d may be formed of an insulating material and may prevent the materials of the first cholesteric liquid crystal layer 251d and the materials of a second cholesteric liquid crystal layer 252d, which is disposed on the bottom surface of the blocking layer 253d, from being mixed with, or affecting, each other.

The second cholesteric liquid crystal layer 252d is disposed on a surface of the blocking layer 253d facing the lower display panel 10, i.e., on the bottom surface of the blocking layer 253d. The second cholesteric liquid crystal layer 252d may be formed by an inkjet process or an application process. Since no particular barriers are provided, the second cholesteric liquid crystal layer 252d may be formed on the entire bottom surface of the upper substrate 210, rather than on part of the bottom surface of the upper substrate 210.

Even though the first and second cholesteric liquid crystal layers 251d and 252d are disposed overlapping each other, the prevention of color mixing by the first and second cholesteric liquid crystal layers 251d and 252d can be properly performed. Specifically, since the first and second cholesteric liquid crystal layers 251d and 252d can both transmit light of the first wavelength band therethrough, light of the first wavelength band incident on the upper display panel 20d from the lower display panel 10 can be properly delivered to the first and second wavelength conversion layers 241d and 242d. Also, light of the second wavelength band emitted from the first wavelength conversion layer 241d toward the lower display panel 10 can be reflected by the first cholesteric liquid crystal layer 251d and can thus travel in a direction toward the upper substrate 210. Also, light of the third wavelength band emitted from the second wavelength conversion layer 242d toward the lower display panel 10 can be reflected by the second cholesteric liquid crystal layer 252d and can thus travel in a direction toward the upper substrate 210. Due to the aforementioned arrangement of the first and second cholesteric liquid crystal layers 251d and 252d, color mixing can be reduced or prevented.

Figure 12:
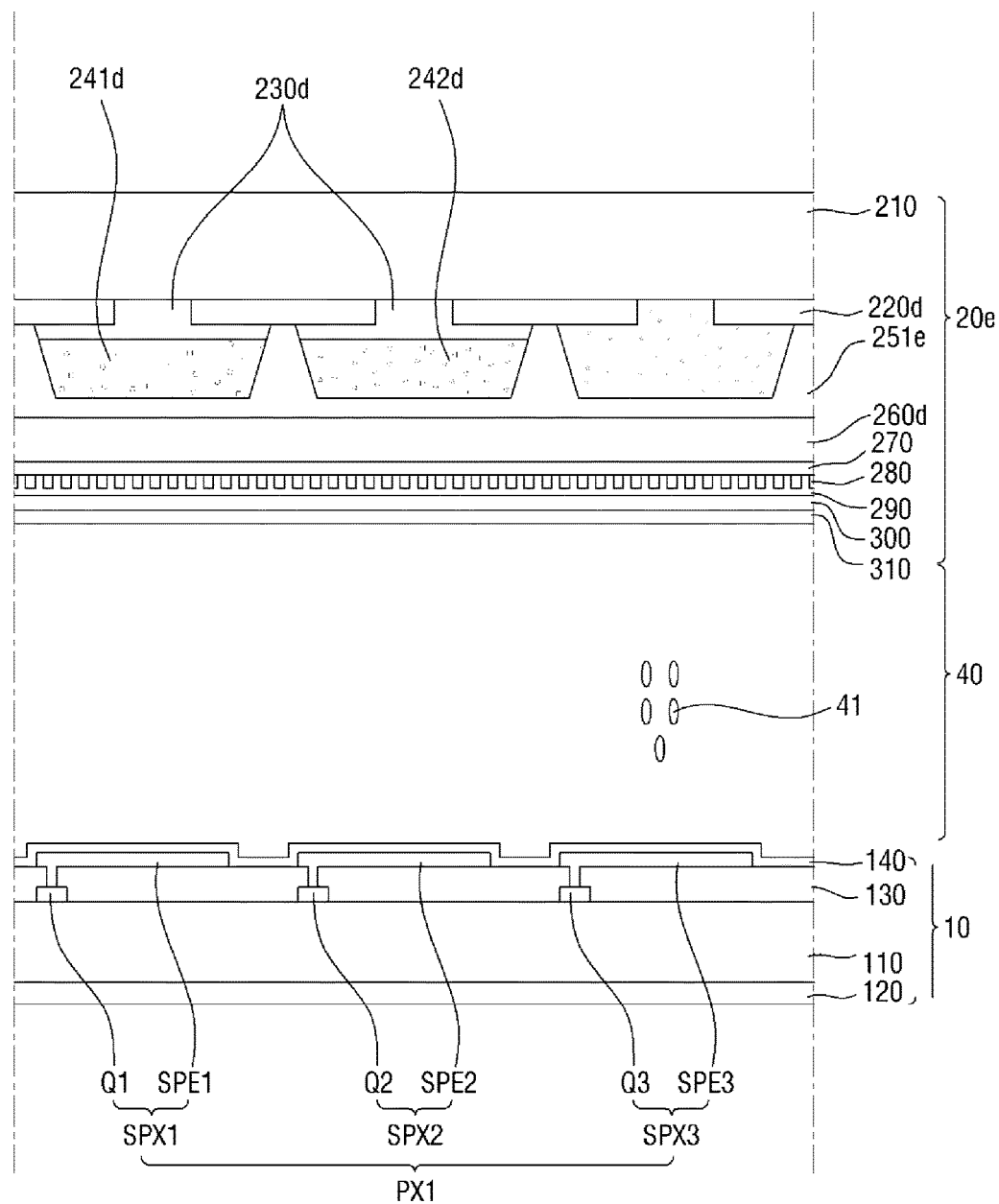
FIG. 12 is a cross-sectional view of a sixth embodiment of a display device constructed according to the principles of the invention.

Referring to FIG. 12, the display device will hereinafter be described, focusing mainly on differences with the display devices of FIGS. 1 and 11.

In FIG. 12, a single cholesteric liquid crystal layer, i.e., a third cholesteric liquid crystal layer 251e, may be formed to perform the functions of both the first and second cholesteric liquid crystal layers 251 and 252 of FIG. 1. The third cholesteric liquid crystal layer 251e may be obtained by diversifying the type of impurities added to the multi-pitch structure that has been described above.

Specifically, the third cholesteric liquid crystal layer 251e is disposed on surfaces of a first wavelength conversion layer 241d, a second wavelength conversion layer 242d, and a transmissive layer 243 facing a lower display panel 10, i.e., on the bottom surfaces of the first wavelength conversion layer 241d, the second wavelength conversion layer 242d, and the transmissive layer 243. The third cholesteric liquid crystal layer 251e may have a multi-pitch structure or may have multiple types of impurities added thereto. Accordingly, the third cholesteric liquid crystal layer 251e may transmit light of the first wavelength band therethrough and may reflect light of the second wavelength band and light of the third wavelength band.

A planarization layer 260d is disposed on a surface of the third cholesteric liquid crystal layer 251e facing the lower display panel 10, i.e., on the bottom surface of the third cholesteric liquid crystal layer 251e. That is, unlike in the display device of FIG. 11, the first cholesteric liquid crystal layer 251d, the blocking layer 253d, and the second cholesteric liquid crystal layer 252d of FIG. 11 are not provided, and the third cholesteric liquid crystal layer 251e may be provided instead. Accordingly, the cross-sectional structure of the display device can be further simplified, the fabrication of the display device can be simplified, and, as a result, the manufacturing cost of the display device can be reduced.

The benefits and effects obtained by devices and methods constructed according the principles of the invention are not limited by the foregoing, and other various benefits and effects are anticipated.

Although certain exemplary embodiments and implementations have been described herein, other embodiments and modifications will be apparent from this description. Accordingly, the inventive concepts are not limited to such embodiments, but rather to the broader scope of the presented claims and various obvious modifications and equivalent arrangements.

What is claimed is:

1. A display device, comprising:
   a first substrate;
   a pixel unit disposed on the first substrate and including a first sub-pixel electrode, a second sub-pixel electrode and a third sub-pixel electrode, the first through third sub-pixel electrodes being adjacent to one another;
   a second substrate facing the first substrate;
   a first wavelength conversion layer disposed on a surface of the second substrate facing the first substrate, and overlapping the first sub-pixel electrode;
   a second wavelength conversion layer disposed on the surface of the second substrate facing the first substrate, and overlapping the second sub-pixel electrode;
   a transmissive layer disposed on the surface of the second substrate facing the first substrate, and overlapping the third sub-pixel electrode;
   a first cholesteric liquid crystal layer disposed on a surface of the first wavelength conversion layer facing the first substrate;
   a second cholesteric liquid crystal layer disposed on a surface of the second wavelength conversion layer facing the first substrate; and
   a planarization layer disposed on the surfaces of the first and second cholesteric liquid crystal layers facing the first substrate and on a surface of the transmissive layer facing the first substrate,
   wherein:
   the first and second wavelength conversion layers comprise a quantum dot;
   the first wavelength conversion layer is configured to receive light of a first wavelength band and to convert the received light into light of a second wavelength band different from the first wavelength band;
   the second wavelength conversion layer is configured to receive the light of the first wavelength band and to convert the received light into light of a third wavelength band different from the second wavelength band;
   the first cholesteric liquid crystal layer is configured to reflect some of the light of the second wavelength band; and
   the second cholesteric liquid crystal layer is configured to reflect some of the light of the third wavelength band.

2. The display device of claim 1, wherein the first and second wavelength conversion layers further comprise a phosphor.

3. The display device of claim 1, wherein the transmissive layer is configured to transmit the light of the first wavelength band therethrough.

4. The display device of claim 1, wherein
   the first and second cholesteric liquid crystal layers comprise impurities, and
   a concentration or type of the impurities included in the first cholesteric liquid crystal layer differs from a concentration or type of the impurities included in the second cholesteric liquid crystal layer.

5. The display device of claim 1, wherein during operation of the display device:
   the light of the second wavelength band reflected by the first cholesteric liquid crystal layer is right-handed polarized light, and
   the light of the third wavelength band reflected by the first cholesteric liquid crystal layer is right-handed polarized light.

6. The display device of claim 1, further comprising:
   an alignment film disposed on at least one surface of each of the first and second cholesteric liquid crystal layers.

7. The display device of claim 1, further comprising:
   a opaque member disposed on the surface of the second substrate facing the first substrate and forming barriers, which separate the first cholesteric liquid crystal layer, the second cholesteric liquid crystal layer, and the transmissive layer from one another.

8. The display device of claim 7, wherein
   the opaque member comprises a light-shielding member projecting toward the first substrate beyond the surfaces of the first and second cholesteric liquid crystal layers facing the first substrate.

9. The display device of claim 1, further comprising:
   a polarizing layer disposed on a surface of the planarization layer facing the first substrate.

10. The display device of claim 9, wherein the polarizing layer comprises a wire grid polarizer.

11. A display device, comprising:
    a first substrate;
    a pixel unit disposed on the first substrate and including a first sub-pixel electrode, a second sub-pixel electrode and a third sub-pixel electrode, the first through third sub-pixel electrodes being adjacent to one another;
    a second substrate facing the first substrate;
    an opaque member disposed on a surface of the second substrate facing the first substrate having openings to permit light from the first through third sub-pixel electrodes to pass through a respective one of the openings;
    a first wavelength conversion layer disposed on a surface of the opaque member facing the first substrate, and overlapping the first sub-pixel electrode;
    a second wavelength conversion layer disposed on the surface of the opaque member facing the first substrate, and overlapping the second sub-pixel electrode;
    a transmissive layer disposed on the surface of the opaque member facing the first substrate, and overlapping the third sub-pixel electrode;
    a reflective layer disposed on surfaces of the first wavelength conversion layer, the second wavelength conversion layer, and the transmissive layer facing the first substrate; and
    a planarization layer disposed on a surface of the reflective layer facing the first substrate,
    wherein the reflective layer comprises the first cholesteric liquid crystal layer disposed on the surfaces of the first wavelength conversion layer, the second wavelength conversion layer, and the transmissive layer facing the first substrate, a blocking layer disposed on a surface of the first cholesteric liquid crystal layer facing the first substrate, and the second cholesteric liquid crystal layer disposed on a surface of the blocking layer facing the first substrate.

12. The display device of claim 11, wherein
    the opaque member comprises a light-shielding member;
    first and second cholesteric liquid crystal layers comprise at least one of a quantum dot and a phosphor,
    the first wavelength conversion layer is configured to receive light of a first wavelength band and to convert the received light into light of a second wavelength band different from the first wavelength band, and
    the second wavelength conversion layer is configured to receive the light of the first wavelength band and to convert the received light into light of a third wavelength band different from the second wavelength band.

13. The display device of claim 11, wherein
the first cholesteric liquid crystal layer is configured to reflect some of the light of the second wavelength band, and
the second cholesteric liquid crystal layer is configured to reflect some of the light of the third wavelength band.

14. The display device of claim 12, wherein the reflective layer includes a third cholesteric liquid crystal layer disposed on the surfaces of the first wavelength conversion layer, the second wavelength conversion layer, and the transmissive layer facing the first substrate.

15. The display device of claim 14, wherein the third cholesteric liquid crystal layer is configured to reflect some of the light of the second wavelength band and some of the light of the third wavelength band.

16. A method of manufacturing a display device, the method comprising the steps of:
preparing a substrate on which a first wavelength conversion layer configured to receive light of a first wavelength band and convert the received light into light of a second wavelength band, a second wavelength conversion layer configured to receive the light of the first wavelength band and convert the received light into light of a third wavelength band, and a transmissive layer configured to transmit the light of the first wavelength band therethrough are disposed;
forming a first cholesteric liquid crystal layer on the first wavelength conversion layer;
forming a second cholesteric liquid crystal layer on the second wavelength conversion layer; and
forming a planarization layer on the first cholesteric liquid crystal layer, the second cholesteric liquid crystal layer, and the transmissive layer,
wherein:
the first and second wavelength conversion layers comprise a quantum dot;
the first wavelength conversion layer is configured to receive light of a first wavelength band and to convert the received light into light of a second wavelength band different from the first wavelength band;
the second wavelength conversion layer is configured to receive the light of the first wavelength band and to convert the received light into light of a third wavelength band different from the second wavelength band;
the first cholesteric liquid crystal layer is configured to reflect some of the light of the second wavelength band; and
the second cholesteric liquid crystal layer is configured to reflect some of the light of the third wavelength band.

17. The method of claim 16, wherein the steps of forming the first cholesteric liquid crystal layer and the forming the second cholesteric liquid crystal layer are performed by an inkjet process.

* * * * *